Patented Aug. 5, 1952

2,606,173

UNITED STATES PATENT OFFICE 2,606,173

POLYSULFIDE POLYMER REACTION AND PRODUCT

Edward M. Fettes, Trenton, N. J., assignor, by mesne assignments, to Reconstruction Finance Corporation, Washington, D. C., a corporation of the United States No Drawing. Application March 1, 1951, Serial No. 213,475

13 Claims. (Cl. 260—79.1)

This invention relates to polysulfide polymers and more particularly to a process whereby certain known polysulfide compounds can be converted into polysulfide polymers characterized by the fact that (a) they have a predetermined and controllable number of monomeric units and (b) they include nonsulfur-containing reactive groups which confer upon the polymeric products various new and useful properties outlined hereafter. The present application is a continuation-in-part of my prior application Serial No. 662,921, filed April 17, 1946, now abandoned.

Polysulfide polymers can be identified by stating that they are composed essentially of recurring units having the formula —SRS—. They may be either linear, partially cross-linked or completely cross-linked. The linear compounds may, if the compounds have —SH terminals, be symbolized by the formula $H(SRS)_x(SR'S)_yH$. In this formula R and R' are radicals having a skeleton carbon structure selected from the group consisting of

and

designating respectively adjacent carbon atoms and carbon atoms joined to and separated by intervening structure. $x$ and $y$ are integers indicating the number of the respective units and the ratio of those integers determines the proportion of those units in the copolymers. Where $x$ or $y=0$ the result is a homopolymer. The cross-linked polymers are characterized by the recurring units

and

wherein R may have the same structure as indicated for the linear polymers.

The polymers may be divided broadly into two classes (a) the normally solid polymers having molecular weights as high as say 100,000 to 200,000 and (b) polymers which can be obtained by splitting those high polymers into lower polymers. The splitting may be effected, i. e., in accordance with the disclosure of U. S. Patent 2,466,963 to Patrick and Ferguson. In class (b) are the polymers normally, i. e., at 25° C., existing as flowable liquids and having molecular weights ranging from those of dimers up to about 15,000.

Both classes are widely used. The high polymers as such or in the form of solutions in organic solvents or dispersions in water are used for such purposes as binders for transmission belts, linings for propane and butane gas hose, hose for paint spray equipment, high pressure grease-gun hose, linings for hose to convey gasoline, oil, etc., pump pistons and cups in oil slush pumps, protective jackets for high tension wires and portable cables, printing rollers and blankets for newspaper printing, gaskets, washers, packing in all industries, covers for conveyor belting, balloon fabric, diaphragms for controllers, regulators and meters, binders and adhesives for use with leather, cork and felts, seals for prevention of refrigerant leakage, gloves for chemical plants and paint factories, printing plates for use with inks, paints, etc., packings for compressors, many specialty molded products, protective liners and lining means for tanks, etc., such as those used in refineries and in dry cleaning equipment, and numerous other uses.

In connection with many of the foregoing uses in order to develop properties such as strength, solvent resistance, etc., to the highest degree curing is necessary. For that purpose metallic oxides, especially zinc oxide, are commonly used.

The liquid polymers are also extensively used, the uses including protective coatings, impregnants, adhesives, caulking, binders, flexibilizers, printers' rolls, poured gaskets and joint sealers. There also curing is employed to transform the liquid polymers to the solid condition, harden them and develop the properties of strength, solvent resistance, etc., to the desired degree. Oxidation is one step used for that purpose, various oxidizing agents including metallic peroxides being employed.

Objects of the invention include the following:

a. To introduce new functional groups into the polymers, e. g. hydroxyl, carboxyl and amino groups.

b. To change the degree of polymerization of a polymer to any desired extent, i. e. to increase or decrease it. For example a normally solid high polymer may be softened or converted to a normally liquid polymer or to a monomer.

c. To produce new classes and species of organic chemicals useful as such or as intermediates for conversion into other useful products.

The following examples will illustrate the utility of the invention.

The high polymers are usually cured by heating with metallic oxides. For some purposes the electrical properties, e. g. the dielectric constants of the cured product or vulcanizate are impaired by the presence of metallic oxides therein. By introducing new groups a different type of curing can be effected. For example by introducing hydroxy groups or carboxyl groups curing can be effected by heating with polycarboxylic acids or polyhydric alcohols respectively and thus a cured product can be produced free from metal oxides and having a relatively high dielectric constant.

It is frequently desirable to soften a high polymer to facilitate processing, or to convert it to a liquid polymer to secure the advantages of liquid over solid polymers.

The amber liquid polysulfide polymers are polymercapto compounds and their uses are limited by the presence of mercapto groups. The present invention makes it possible to replace those SH groups with other functional groups such as alcoholic hydroxyl, phenolic hydroxyl, carboxyl, nitrile, nitro, amino, alkyl carbonyl and aldehyde and thus new classes and species of organic chemicals or intermediates are obtained. They may be used as such as plasticizers, oil additives, fungicides and insecticides and other applications. They may also be converted into other new and useful products including new resins, elastomers and plastics. The hydroxyl compounds constitute new glycols or polyhydric alcohols which produce new resins by reaction with polycarboxylic acids. The carboxyl derivatives when reacted with glycols or polyhydric alcohols also produce new resins. The amino derivatives when reacted with dibasic acids, acid chlorides or anhydrides produce new polyamide plastics useful in making filaments.

Liquid polymers produced in accordance with the present process are particularly useful for those applications where a polysulfide polymer is desired that is free from mercapto groups and has a fluidity falling within a relatively narrow predetermined range. In the manufacture of electrical transformers, for example, so-called "potting compounds" are used to coat the windings and in order to secure desired penetration by the coating composition a controllable fluidity is required. Liquid polymers can be prepared by the present method that have hydroxyl terminals and the desired fluidity, and these polymers can be mixed with, for example, adipic acid, applied to the transformer windings, and the coating baked to convert the mixture to a solid layer having desirable protective properties.

Other applications wherein freedom from mercapto groups combined with precise fluidity control are important include liquids used in fluid drives for mechanical members, and oil additives to reduce oxidation and increase the lubricity of lubricating oils.

In general the process of the invention involves treating a polysulfide compound $(RSS)_n$ with a monomeric mercaptan represented by the formula $HSR'F$. In these general formulae R and R' are radicals selected from the groups

and

designating, respectively, adjacent carbon atoms and carbon atoms joined to and separated by intervening structure; $n$ is a positive integer which may vary from say 1 to 1000 or even higher; HS is a mercapto group joined to the radical R'; and F is a nonsulfur-containing reactive group selected from the following:

—OH
alcoholic hydroxyl

—OH
phenolic hydroxyl

—COOH
carboxyl

—NO₂
nitro

—CN
nitrile or cyanide

NH₂
amino

RCO
alkyl carbonyl where R=alkyl radical

—CHO
aldehyde

—CONH₂
amide

It has been found that the foregoing functional groups do not interfere with the reactions of the present process as described herein.

Although the radicals R and R' need not necessarily have the same specific structures, it is sometimes desirable that they have the same structure to maintain a similarity in chemical properties between the starting material and product.

In order to point out further the general character of the present process there is set forth below a series of reactions which probably represent what occurs when a typical known polysulfide polymer is treated in accordance with the present method. For purposes of illustration a polymer has been selected which can be represented by the general formula $$H(SRS)_m(SRS)_p(SRS)_q(SRS)_tH$$

This polymer has terminal mercapto groups and the subscripts $m$, $p$, $q$ and $t$ are positive integers representing a particular number of recurring SRS units. The reaction of this polymer with HSR'F may be written as follows:

(1) $H(SRS)_m(SRS)_p(SRS)_q(SRS)_tH + HSR'F$
$\rightleftharpoons H(SRS)_m(SRS)_pSR'F + H(SRS)_q(SRS)_tH$ (2) $H(SRS)_m(SRS)_pSR'F + HSR'F + O =$
$FR'S(SRS)_m(SRS)_pSR'F + H_2O$ (3) $H(SRS)_q(SRS)_tH + 2HSR'F + 2(O) =$
$FR'S(SRS)_q(SRS)_tSR'F + 2H_2O$ The product polymers of Equations 2 and 3 can then react with HSR'F as follows:

(4) $FR'S(SRS)_m(SRS)_pSR'F + HSR'F \rightleftharpoons$
$FR'S(SRS)_mSR'F + H(SRS)_pSR'F$ (5) $H(SRS)_pSR'F + HSR'F + O =$
$FR'S(SRS)_pSR'F + H_2O$ (6) $FR'S(SRS)_q(SRS)_tSR'F + HSR'F \rightleftharpoons$
$FR'S(SRS)_qSR'F + H(SRS)_tSR'F$ (7) $H(SRS)_tSR'F + HSR'F + O =$
$FR'S(SRS)_tSR'F + H_2O$ The foregoing reactions are reversible but can be caused to proceed in the indicated direction by removal of water that is produced as a reaction product. It is evident that the result of these reactions is to split the original polymer into four fragments, each of which has terminal SR'F groups. Moreover, the reaction is capable of being continued to the point where the polymer has been split down to monomeric form. It has been found that by proper selection of the relative proportions of monomeric mercaptan and polymer the reaction can be caused to proceed to a desired extent to produce a product containing a predetermined number of the recurring units. Thus, if it is desired to produce a product containing $n$ recurring units SRS, this product can be obtained by using a reaction mixture containing approximately $2/n$ mols of the monomeric mercaptan for each mol of SRS in the polymer used as a starting material.

The following example illustrates further the manner in which the proper proportions are selected to give a polymer of a predetermined degree of polymerization. Assume that it is desired to convert the polymer $H(SC_2H_4OCH_2OC_2H_4S)_{100}H$ into a polymer with terminal hydroxyl groups and having 5 of the recurring units, and that the conversion is to be effected with mercaptoethanol. In this case $n=5$ and $2/n=0.4$. The molecular weight of the recurring ring unit is 166 and that of the mercaptoethanol is 78. Since the starting polymer is nearly all composed of the recurring unit SRS the desired 5-unit product can be obtained by causing approximately $$\frac{0.4 \times 78}{166} \times 1000 = 188$$

grams of the mercaptoethanol to react with each kilogram of the original polymer. It should be particularly noted that the subscript 100 does not enter into these computations, that is to say, it is unnecessary to know the precise degree of polymerization of the starting polymer.

It will of course be understood that the equations and computations given above are illustrative only. Thus, the starting material used in Equations 1–7 is a material having mercaptan terminals, but the presence of such mercaptan terminals is not essential. Moreover, analogous reactions may be used to build up a polymer of desired predetermined size from a lower molecular weight polymer or even from a monomer. The starting polymer of Equations 1–7 is illustrated as a linear polymer but the present process is not limited to linear polymers, since it has been found that polymers with a moderate amount of crosslinkage can be used satisfactorily. The polysulfide polymers used as a starting material may be of the type disclosed in Patrick Patent 2,363,614 and as indicated in the disclosure of that patent the radical R may vary widely in its specific structure. Similarly, the specific structure of the radical R' of the monomeric mercaptans may vary. Illustrative examples of mercaptans useful in the present process are listed in Table I.

TABLE I (1) HS.C₂H₄OH
mercapto ethanol (2) HS.CH₂COOH
mercapto acetic acid (3) HS.C₂H₄CN
beta mercapto propionitrile (4) HS.C₂H₆NO₂
1 mercapto 3 nitro n-propane (5) HS.⬡NH₂
p-amino thiophenol (6) HS.⬡NO₂
p-nitro thiophenol TABLE I—Continued (7) HS.CH₂CH₂CO.CH₃
beta acetyl ethyl mercaptan (8) HS.⬡CHO
p-mercapto benzaldehyde (9) HS.CH₂CONH₂
mercapto acetamide

(10) HS.⬡OH
     NO₂
p-hydroxy thiophenol

(11) HS.⬡NO₂
2-4 dinitro thiophenol

From a consideration of the equations given above, it is apparent that the present process includes an oxidation step which, as indicated in Equations 2, 3, 5 and 7, results in the elimination of the mercapto groups. The oxidation step is preferably carried out as a second and subsequent step of the reaction and may be effected with any of a variety of oxidizing agents. Thus, oxidation may be effected with air or liquid or solid oxidizing agents may be used, for example, peroxides such as lead peroxide and hydrogen peroxide and also cupric oxide, silver oxide, arsenic pentoxide, sodium hypochlorite, potassium persulfate, iodine, and sulfur. The manner in which oxidation is effected is more particularly pointed out in the specific examples given hereafter.

As previously indicated, the products of the present process have reactive terminal groups that may be hydroxyl, carboxyl, nitro, amino, aldehyde, nitrile or alkyl carbonyl groups. The presence of these terminal reactive groups greatly increases the versatility of the present product. If the terminals are, for example, hydroxyl groups, then the polymeric products obtained according to the invention are long chain dialcohols or glycols. These polymeric glycols are capable of undergoing the usual reactions of glycols, that is, they may be esterified with acids, acid chlorides or acid anhydrides to form esters or reacted with isocyanates or isothiocyanates to form urethanes or thiourethanes. If the group F on the mercaptan is a carboxyl group, then a high polymer dibasic acid is formed which may be reacted with amines to form amides or may be reacted with cations to form salts.

It is an important purpose of the present invention to introduce the functional group F in controlled amounts, into the polymeric molecule so that the polymeric molecule will be capable of further activity along desired lines. For instance, hydroxyl groups may be esterified using bifunctional or polyfunctional acids such as oxalic, succinic, adipic, citric, etc., to produce a considerable increase in molecular weight. In fact, if the molecular weight of the initial polymer is high enough such treatment may produce a change similar to the vulcanization of rubber and result in a polymer resembling a vulcanized polysulfide polymer. The resultant polymer being a polysulfide polymer and having relatively small amounts of these uniting groups will have predominately the properties of the polysulfide polymers in general and will therefore be subject to practically all of the uses of the conventional polysulfide type polymer.

The polymers of the present invention have the advantage of being capable of undergoing a cure or vulcanization, by use of a wider variety of compounding ingredients than the usual polysulfide polymers. For hydroxyl terminals a dibasic acid may be used, or a diisocyanate or any other difunctional material which will react and produce a link between the two molecules present before such reactions. Carboxyl groups may be joined by the use of glycols, diamines, etc. It is thus evident that one object of the invention is to provide new terminals on the polysulfide chains which will permit the utilization of a wider variety of curing reagents.

The polysulfide polymers used as a starting material in the present process may be prepared in any of various ways, and in many cases, procedures are known for preparing such polymers. In order to define accurately the nature of the starting material used in the specific examples set forth hereafter, four illustrative procedures for preparing polysulfide polymers suitable for use in the present process are given below and designated Process A, B, C, and D, respectively.

Process A

Preparation of the polymer: In a flask of 5 liters capacity and provided with suitable stirring equipment, thermometer and reflux condenser, are placed 2 liters of a 2-molar solution of sodium tetrasulfide, that is, a quantity of solution containing 4 mols of $Na_2S_4$. To the polysulfide are added 10 grams of sodium hydroxide dissolved in 25 cc. of water, followed by a solution of 25 grams of crystallized $MgCl_2$ in 50 cc. of water. The mixture is mechanically agitated and heated to a temperature of about 70° C. and then 3.5 mols of BB' dichlorodiethyl formal are added at such a rate that about one hour is required for the complete addition of the formal. The reaction is exothermic, and the temperature is so controlled that it does not go above about 90° C. during the addition of the organic reactant.

The heating is continued for about one hour at a temperature of around 100° C. after the organic halide has completely reacted, after which the contents of the flask are diluted to capacity with water, and the latex-like dispersion which has formed as a result of the reaction is allowed to settle out and the supernatant liquid is removed by decantation or siphoning.

The latex is freed from water soluble byproducts by repeated washing with water, allowing the latex to settle out of the liquid each time, and removing the supernatant liquid. To the washed latex are added 4 mols of sodium hydroxide in the form of a 50% solution of NaOH, and the mixture is mechanically agitated and heated to a temperature of about 90° C. for about 30 minutes, to effect removal of the labile sulfur, i. e., stripping, in accordance with the technique set forth in Patrick Patent No. 2,278,128, issued March 31, 1942. The latex is washed as before by repeated dilution with water and settling to remove the alkali metal polysulfide formed by the stripping treatment with sodium hydroxide.

The washed latex from this last treatment is substantially a high molecular weight polymeric form of the disulfide of diethylene formal, the polymer initially formed having been further polymerized by the alkaline disulfide generated in situ by the action of the sodium hydroxide. The product thus produced is tough, rubbery, amber-colored material.

Instead of sodium tetrasulfide, any inorganic soluble polysulfide may be used, and, if the disulfide be used, the above mentioned step of stripping will be unnecessary, but it is then desirable to use a large molecular excess of disulfide in relation to the organic reactant or to react the initially obtained polymer with an alkaline polysulfide, e. g., by reacting the initial polymer with about 50 mol percent of alkaline disulfide. If desired, the polymer can be separated from the latex by the evaporation or distillation of the water or by coagulation as described in Process B below.

Process B

A polymer is prepared by reacting 4 mols of sodium disulfide with 3 mols of beta beta prime dichlorodiethyl ether at a temperature of about 70°–90° C. The reaction is preferably carried out in aqueous dispersion to secure a latex-like dispersion of polymer particles in water. After the initial reaction is completed, an additional quantity of about 2 mols of sodium disulfide is added and the latex-like dispersion is heated in the presence of the additional disulfide to a temperature of about 70°–90° C. for one hour after which the dispersed latex is washed by decantation until free from soluble electrolytes.

The final latex-like dispersion so obtained can be coagulated by the addition of a dilute acid to produce a pH of about 3, after which the coagulum so produced is freed from water by any suitable means, such as milling or drying at elevated temperatures. The product thus obtained is tough and rubber-like and is a polymeric form of the disulfide of diethyl ether. It can be mixed on a rubber mill or any other suitable masticating device with any mercaptan having the general formula HSR'F where R' and F have the definitions already given.

In Processes A and B polyhalogenated organic compounds in general may be substituted for the specific halogenated compounds shown. Numerous examples of suitable polyhalogenated compounds are disclosed in various Patrick patents, e. g., 2,216,044. Similar polymers can also be made by the marcapto reaction, numerous examples of which are disclosed in Patrick Patent 2,142,145. Instead of polymers, copolymers may be employed, numerous examples of which are disclosed in Patrick Patent 2,363,614. All of such polymers may be identified as synthetic polymers composed essentially of units (RSS) where R has the definition given above.

Process C

To 8.4 lb. mols of sodium polysulfide having a rank of 2.25 and dissolved in 540 gallons of water, there are added 48 pounds of crystallized magnesium chloride and 15 pounds of flake caustic soda. The mixture is preferably heated to 185° F. and to it are added 8 lb. mols of dichlorodiethyl formal. The organic halide is added slowly so that a period of about one hour is consumed. During this feed the heat of reaction is used to carry the temperature up to 210° F. During this time the reacting polysulfide mixture is kept under continuous and efficient agitation to produce a highly dispersed latex-like reaction product. At the end of the halide feed the reaction mixture is held for 60 minutes at 212° F. The latex is washed free from soluble salts by washing with water and intermittent decantation.

In order to produce a satisfactory degree or state of high polymerization in the latex just described, it is desirable to employ an aftertreatment which comprises heating the latex in the presence of 2 lb. mols of sodium disulfide in the form of a 2-molar solution of that salt.

The polysulfide in polymer dispersion is then heated 30 minutes at a temperature of 185° F. after which the excess polysulfide is removed by washing and decanting. The latex is again washed twice to remove most of the soluble salts. The molecular weight of the polymer at this point is high, i. e., of the order of 100,000 to 200,000.

The high polymer is then "split" or disarticulated by treatment of the latex with 0.8 lb. mol of sodium hydrosulfide (NaSH) and 4.4 lb. mols of sodium sulfite (Na$_2$SO$_3$). The latex is heated with agitation in the presence of these splitting salts for 60 minutes at 180° F. The latex is washed until substantially free from soluble materials. It is then caused to coagulate by the addition of an amount of acid which will produce a hydrogen ion concentration corresponding to about a pH of between 4 and 5. The agglomerated polymer produced by this acid treatment is then washed completely free from soluble salts preferably by the use of cold water. After drying the polymer thus produced is a very viscous amber liquid with a mercaptan-like odor.

The molecular weight of the product resulting from the above treatment is found to vary between 4000 and 5000, determined cryoscopically by solution in benzene, and to have a molecular size of between 25 and 30 units, whereas the molecular weight of the polymer prior to the splitting treatment just described is too high to be quantitively determined by any of the ordinary methods known to the chemist for determining molecular weight. The molecular weight of the higher polymer may be estimated at between 100,000 and 200,000. The product produced by the splitting has the formula

HSRSSR . . . SSRSH from which it will be seen that it is essentially an organic polythiopolymercaptan.

Process D

A polymer having a lower molecular weight than that produced by Process C can be obtained by following the procedure of Process C down to the point where the splitting or dismemberment steps are described and then continuing as follows:

In Process D the splitting is carried out by the addition to the washed latex of 1.6 lb. mols of sodium hydrosulfide (NaSH) and 4.4 lb. mols of anhydrous sodium sulfite (Na$_2$SO$_3$). The latex containing the splitting salts is heated with considerable agitation for a period of one hour at a temperature of 180° F. The split latex is acidified directly with acetic acid without intermediate washing and the final pH of the liquid is adjusted to 4–5 after which the semi-liquid reaction polymer is washed by settling and decanting with successive changes of water until substantially free from soluble salts. The product thus obtained is a liquid or flowable product at normal temperatures, e. g., about 70° F., this also being true of the polymer produced in Process C and the characteristics of these two polymers are similar except that the viscosity of the polymer of Process D is less than that of Process C. The molecular weight of the product of Process D is approximately 1200 corresponding to from 7–8 units.

In order to point out more fully the nature of the present invention the following specific examples are given of illustrative methods of carrying out the invention.

Example 1

To 166 grams of the polymer made according to Process A, i. e., 1 gram-mol of the recurring unit of this polymer, are added 7.8 grams, i. e., $\frac{1}{10}$ gram-mol of mercapto ethanol. The mercapto ethanol is added to the polymer on a rubber mill heated to a temperature of about 50° C. The tough, rubber-like polymer is thoroughly masticated with the liquid polymer for a period of one hour, after which the mix is placed in an oven heated to about 70°–100° C. for 10 to 12 hours to complete the reaction. At the end of this time, the initially tough, rubber-like polymer has become a soft, flowable mass, resembling a liquid of very high viscosity.

The viscous mass is then again transferred to a rubber mill and 23.9 grams of lead peroxide worked into the mass to eliminate sulfhydryl terminals by oxidation thereof. The oxidation reaction produces a slight increase of viscosity but the final product can still properly be described as a viscous liquid. It has a molecular weight of around 3000 to 4000.

Example 2

The procedure of Example 1 is followed except that oxidation is effected with an organic oxidizing agent. The viscous liquid from the first step of the process is treated on a rubber mill with 7 grams of paraquinonedioxime and 3 grams of diphenyl quanidine. The product thus obtained is substantially the same as the product of Example 1.

Example 3

The procedure of Example 1 is followed except that oxidation is effected with free sulfur. The viscous liquid from the first step of the process is treated with 4.8 grams of sulfur. The nature of the reaction with sulfur is such that some hydrogen sulfide is given off which may produce a temporary softening of the mass during the milling operation. However, when the hydrogen sulfide has been eliminated from the mass the product will have substantially the same properties as the product of Example 1.

Example 4

The process of Example 1 is followed except that the mercaptan groups are oxidized by using 1 gram of diphenyl guanidine and ten grams of cumene hydroperoxide in the form of a 70% solution of the hydroperoxide. Here again the product has properties substantially the same as those of Example 1.

Example 5

In this example the reaction is carried between the uncoagulated latex of Process A and a monomeric mercaptan. A volume of the latex containing about 166 grams of the polymer is mixed with $\frac{1}{10}$ of a gram-mol (7.8 grams) of mercapto ethanol. The latex is then heated to a temperature of from about 40° C. to 100° C. with stirring for a period of about 5 to 10 hours to cause the initial step of the reaction to proceed. Thereafter atmospheric air is bubbled through the latex for a period of 48 hours to oxidize the sulfhydryl terminals. The resulting latex is then coagulated as for example by the procedure described in Process B and the coagulated mass is a liquid resembling the product of Example 1 in its physical properties and having a molecular weight of the order of 3000 to 4000.

Example 6

The procedure of Example 5 is used except that a solid or liquid oxidizing agent is substituted for atmospheric air. The oxidizing agent is selected from the following group and used in the amount indicated:

| | |
|---|---|
| Hydrogen peroxide (30% aqueous solution) | 15 grams |
| Aqueous sodium hypochlorite | 11.8 grams of hypochlorite |
| Aqueous potassium persulfate | 40.5 grams of persulfate |
| Iodine | 18.9 grams |
| Sulfur | 4.8 grams |

The oxidizing agent is dissolved or thoroughly dispersed in the latex and mixed therewith to oxidize the free sulfhydryl groups of the polymer. In the case of oxidation with iodine, the acidity of the solution should be controlled by the use of, for example, sodium carbonate to prevent the hydriodic acid formed from attacking the formal linkage. The latex after oxidation is coagulated in accordance with the procedure of Process B and the coagulated product is a viscous liquid similar to the product of Example 1.

Example 7

Proceed as in either of Examples 1 or 5, substituting for the mercapto ethanol used in those examples an equivalent molar proportion of any of the mercaptans listed in Table I above. The products obtained are similar to the products of the procedures of Examples 1 and 5.

In the case where product number 8 of Table I is used, the oxidation should be carried out cautiously to avoid oxidizing the aldehyde terminals to the corresponding acids. This cautious oxidation can be effected by using very dilute solution of sodium hypochlorite or free sulfur.

Example 8

To 166 grams, i. e., one unit molecular weight of the polymer derived from beta beta prime dichlorodiethyl formal according to Process D are added 0.4 of a molecular weight (31 grams) of mercapto ethanol, and the liquid mixture is thoroughly stirred. Suitable mixing of the reagents can be conveniently effected in the well-known roller-type paint mill. In order to bring out the interaction between the mercaptan and the polysulfide polymer it is convenient to heat it to a temperature of about 50°–70° C. under which condition the reaction is substantially complete in about 10 hours. This reaction can, if desired, be completed at room temperature, but several days are required to bring about the desired interchange if the reaction mixture is not heated to an elevated temperature.

When this interchange is substantially complete, that is, after about 10 hours at a temperature varying from 50° C. to 70° C., all unreacted mercaptan groups in the polymer are oxidized. This oxidation is effected by passage of a current of air saturated with ammonia through the reaction mixture for a period of 48 hours at 100° C. The final product resulting from the above treatment is a viscous liquid having a molecular weight of approximately 1000 compared with the original molecular weight of about 5000, for the original polymer prior to treatment with the mercapto ethanol and oxidation. The oxidation step of the present example can also be carried out using the oxidizing agents of Examples 1 to 4. In this case, however, the amount of oxidizing agent used should be about 4 times that indicated in Examples 1–4 and the oxidizing agent should be added to the polymer carefully and in small portions.

Example 9

Proceed as in Example 8, but substitute 0.4 of a gram-molecular weight of mercapto acetic acid for the 0.4 of a gram-molecular weight of mercapto ethanol of Example 8. The resulting product is a low molecular weight liquid having carboxyl terminals.

Example 10

Proceed as in Example 8 but substitute for the mercapto ethanol an equivalent molar proportion of any of the other species of mercaptans shown in Table I. The resulting products will all be liquids of relatively low molecular weights.

From the foregoing examples, it is apparent that the present method is applicable to a wide variety of polysulfide polymers which may be made by the methods designated Processes A, B, C and D or by any of various other known methods. The invention is intended in its generic aspects to cover the reaction of substances having the formula HSR′F with polysulfide polymers generally as herein defined. These may be produced from a single organic compound, to obtain a so-called "straight" polymer or from a plurality of specifically different organic compounds whereby copolymers may be made. The polymers so obtained may be wholly linear or partially linear and partially "cross linked."

It is apparent, therefore, that a very large number of specifically different polymers may be reacted with an HSR′F compound. From the generic point of view it is not the specific character of the polysulfide polymer that is important, i. e., the specific structure of the radical or radicals R in the polymer or copolymer but rather the presence of the characteristic —SS— linkage with or without SH terminals.

To further emphasize the generality of polymers which may be reacted with a mercaptan indicated by the general formula HSR′F in accordance with the present invention, it may be pointed out that in making the polymers in accordance with Processes A and B organic compounds which are polyfunctional in terms of carbon-attached halogen atoms (or other carbon-attached substituents split off by reaction with alkaline polysulfides and therefore equivalent to said halogen atoms) may be substituted for the specific functional compounds identified in Processes A and B. Numerous examples of said halogenated organic compounds are disclosed in a number of patents of Joseph C. Patrick as, for example, U. S. Patents 1,890,191, December 6, 1932, and 2,216,044, September 24, 1940. Polyhalogenated organic compounds containing three or more carbon-attached halogen atoms or equivalent substituents may also be used and especially mixtures of said organic compounds containing three or more carbon-attached halogen atoms with organic compounds containing only two carbon-attached atoms; and the same substitutions may be made in Processes A and B producing the polymer which is subjected to cleavage at the SS links. Moreover, instead of making said polymers by the reaction of the organic compounds mentioned with alkaline polysulfides, similar polymers may be made by oxidizing polymercapto compounds, that is, organic compounds having 2, 3 or more mercapto carbon-attached groups instead of halogen atoms.

What is claimed is:

1. A process of producing a polysulfide polymer having a predetermined desired number of recurring SRS units and nonsulfur-containing terminal functional groups which comprises reacting a synthetic polymer characterized by recurring units having the formula SRS with a reagent consisting solely of a monomercaptan having the formula HSR'F, where R and R' are radicals selected from the group consisting of

and

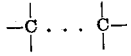

designating, respectively, adjacent carbon atoms and carbon atoms joined to and separated by intervening structure and F is a radical selected from the group consisting of alcoholic hydroxyl, phenolic hydroxyl, carboxyl, nitrile, nitro, amino, alkyl carbonyl, and aldehyde groups, and thereafter oxidizing the reaction products to oxidize and condense substantially all sulfhydryl groups therein and thereby produce new disulfide links in said products, the compound HSR'F being used in the proportion of approximately $2/n$ mols of said compound to one unit mol of said polymer, where $n$ is the number of recurring SRS units in the desired product and is less than the number of recurring SRS units in the original polymer.

2. Process of producing a polysulfide polymer having a predetermined desired number of recurring SRS units and nonsulfur-containing terminal functional groups which comprises reacting a synthetic polymer characterized by recurring units having the formula SRS, said polymer also having mercaptan terminals, with a reagent consisting solely of a monomercaptan having the formula HSR'F where R and R' are radicals selected from the group consisting of

and

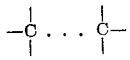

designating, respectively, adjacent carbon atoms and carbon atoms joined to and separated by intervening structure and F is a radical selected from the group consisting of alcoholic hydroxyl, phenolic hydroxyl, carboxyl, nitrile, nitro, amino, alkylcarbonyl, and aldehyde groups, and thereafter oxidizing the reaction products to oxidize and condense substantially all sulfhydryl groups therein and thereby produce new disulfide links in said products the compound HSR'F being used in the proportion of approximately $2/n$ mols of said compound to one unit mol of said polymer where $n$ is the number of recurring SRS units in the desired product and is less than the number of recurring SRS units in the original polymer.

3. A process of producing a polysulfide polymer having a predetermined desired number of recurring SRS units and nonsulfur-containing terminal functional groups which comprises reacting with a reagent consisting solely of mercapto ethanol a synthetic polymer characterized by recurring units having the formula SRS, said polymer also having mercapto terminals, where R is a radical selected from the group consisting of

and

designating, respectively, adjacent carbon atoms and carbon atoms joined to and separated by intervening structure, and thereafter oxidizing the reaction products to oxidize and condense substantially all sulfhydryl groups therein and thereby produce new disulfide links in said products, the mercapto ethanol being used in the proportion of approximately $2/n$ mols to one unit mol of said polymer where $n$ is the number of recurring units in the desired products and is less than the number of recurring SRS units in the original polymer said mercapto ethanol being reacted with said polymer by heating the reaction mixture at temperatures of 40° to 100° C. for 5 to 10 hours.

4. A process of producing a polysulfide polymer having a predetermined desired number of recurring SRS units and nonsulfur-containing terminal functional groups which comprises reacting with a reagent consisting solely of mercapto acetic acid a synthetic polymer characterized by recurring units having the formula SRS, said polymer also having mercapto terminals, where R is a radical selected from the group consisting of

and

designating, respectively, adjacent carbon atoms and carbon atoms joined to and separated by intervening structure, and thereafter oxidizing the reaction products to oxidize and condense substantially all sulfhydryl groups therein and thereby produce new disulfide links in said products, the mercapto acetic acid being used in the proportion of approximately $2/n$ mols to one unit mol of said polymer where $n$ is the number of recurring units in the desired product and is less than the number of recurring SRS units in the original polymer the mercapto acetic acid being reacted with said polymer by heating the reaction mixture at temperatures of 40° to 100° C. for 5 to 10 hours.

5. Process of producing a polysulfide polymer having a predetermined desired number of recurring SRS units and nonsulfur-containing terminal functional groups which comprises reacting with a reagent consisting solely of 1 mercapto 3 nitro n-propane a synthetic polymer characterized by recurring units having the formula SRS, said polymer also having mercaptan terminals, where R is a radical selected from the group consisting of

and

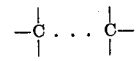

designating, respectively, adjacent carbon atoms and carbon atoms joined to and separated by intervening structure, and thereafter oxidizing the reaction products to oxidize and condense substantially all sulfhydryl groups therein and thereby produce new disulfide links in said products, said mercapto propane being used in the proportion of approximately $2/n$ mols to one unit mol of said polymer where $n$ is the number of recurring units in the desired product and is less than the number of recurring SRS units in the original polymer said mercapto propane being reacted with said polymer by heating at temperatures of 40° to 100° C. for 5 to 10 hours.

6. The process of producing a polysulfide polymer having a predetermined desired number of recurring SRS units and nonsulfur-containing terminal functional groups which comprises reacting a synthetic polymer characterized by recurring units having the formula SRS wherein R is a dialkylene formal radical, with a reagent consisting solely of mercapto ethanol, and thereafter oxidizing the reaction products to condense substantially all sulfhydryl groups therein and thereby produce new disulfide links in said products, said mercapto ethanol being used in the proportion of approximately $2/n$ mols to one unit mol of said polymer, where $n$ is the number of recurring units in the desired product and is less than the number of recurring SRS units in the original polymer.

7. The process of producing a polysulfide polymer having a predetermined desired number of recurring SRS units and nonsulfur-containing terminal functional groups which comprises reacting a synthetic polymer characterized by recurring units having the formula SRS wherein R is a dialkylene ether radical, with a reagent consisting solely of mercapto ethanol, and thereafter oxidizing the reaction products and condense substantially all sulfhydryl groups therein and thereby produce new disulfide links in said products, said mercapto ethanol being used in the proportion of approximately $2/n$ mols to one unit mol of said polymer, where $n$ is the number of recurring units in the desired product and is less than the number of recurring SRS units in the original polymer.

8. Product produced according to the process of claim 2.

9. Product produced according to the process of claim 3.

10. Product produced according to the process of claim 4.

11. Product produced according to the process of claim 5.

12. Product produced according to the process of claim 6.

13. Product produced according to the process of claim 7.

EDWARD M. FETTES.

REFERENCES CITED

The following references are of record in the file of this patent:

UNITED STATES PATENTS

| Number | Name | Date |
|---|---|---|
| 2,142,145 | Patrick | Jan. 3, 1939 |
| 2,186,714 | Youker | Jan. 9, 1940 |
| 2,363,614 | Patrick | Nov. 28, 1944 |

OTHER REFERENCES

Thiokol Liquid Polymer LP-2, 18 pages, pages 5-7 are of especial interest, October 13, 1947, received in the Patent Office February 24, 1948.